March 17, 1970   K. A. STETSON ET AL   3,501,238
METHOD AND APPARATUS FOR ENHANCING DIFFERENCES
BETWEEN SIMILAR SPATIAL SIGNALS
Filed Sept. 6, 1966    2 Sheets-Sheet 1

INVENTORS
KARL A. STETSON
HERBERT A. ELION
BY Kenway, Jenney & Hildreth
ATTORNEYS

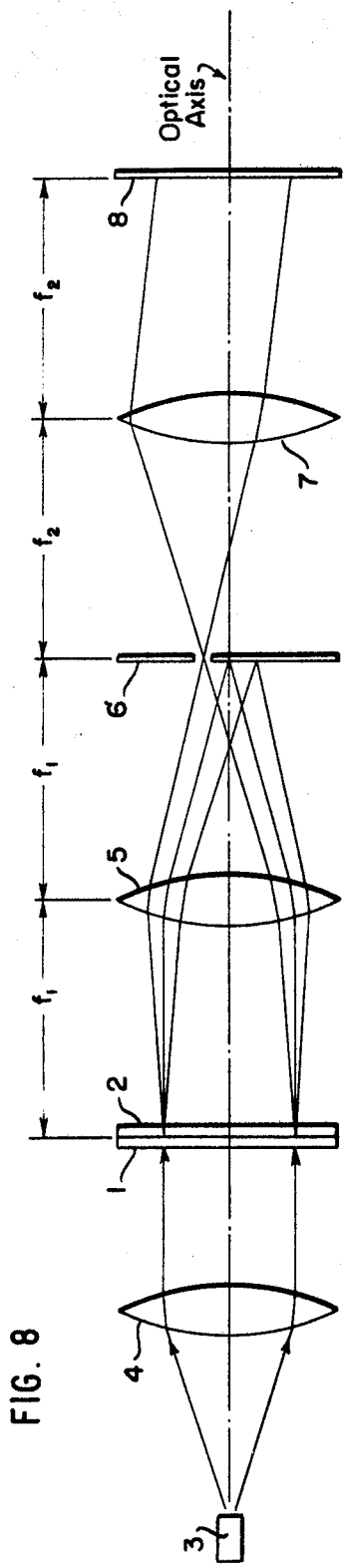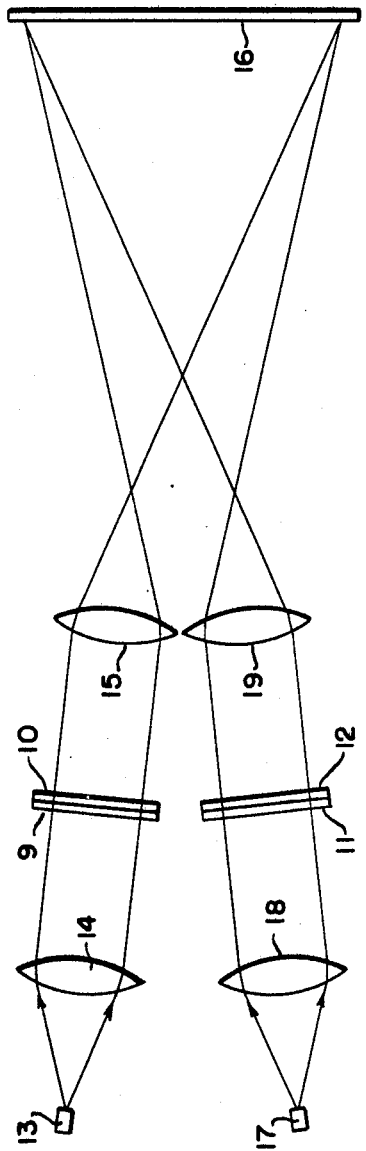

3,501,238
METHOD AND APPARATUS FOR ENHANCING DIFFERENCES BETWEEN SIMILAR SPATIAL SIGNALS
Karl A. Stetson, West Acton, and Herbert A. Elion, Wellesley Hills, Mass., assignors to GCA Corporation, Bedford, Mass., a corporation of Delaware
Filed Sept. 6, 1966, Ser. No. 577,498
Int. Cl. G06k 9/08; G02b 5/18; G03b 27/02
U.S. Cl. 356—71                                  2 Claims

ABSTRACT OF THE DISCLOSURE

In the method disclosed herein, differences between a pair of images are enhanced by making a transparency from each image and a periodic transmission grating, placing the transparencies together so that the image components are substantially in registry and the grating components are in phase opposition, and then illuminating the transparencies with collimated monochromatic light in an optical system including a frequency plane filter to form, from a first order diffracted beam an image having enhanced difference components.

Our invention relates to the analysis of spatial signals, and particularly to a novel method and apparatus for detecting, displaying and recording differences between similar spatial signals.

For many purposes, it is necessary to compare superficially identical spatial signals to detect such differences as may exist between them. For example, reconnaissance photographs, radar maps, sonar maps, spectographs, photographs, radiographs and the like are frequently made of the same field at different times in order to determine what changes have been made in the field between the two recordings. Numerous techniques have been developed for this purpose. Of these, two will be mentioned as illustrative of problems which, so far as we are aware, have not been satisfactorily solved prior to our invention. One simple technique for comparing two similar signals, such as two photographs of the same scene, is to superimpose a positive transparency of one photograph with a negative transparency of the other, and examine or record the image produced by light transmitted through the superimposed transparencies. Relatively gross differences between two images can be detected in this manner, but small differences may be difficult or impossible to detect because of the background signals superimposed on the desired difference signals in the composite image. Another method would require placing positives (or negatives) of the photographs to be compared in the legs of a Mach-Zehnder interferometer, and adjusting the instrument for zero fringes and maximum cancellation of beam transmitted through one photograph by the beam transmitted through the other. The difficulty with this method is that it is too sensitive for many purposes; irrelevant differences between the two photographs tend to obsure the desired differences. For example, the results will be significantly affected by differences between the indices of refraction and the thicknesses of the transparencies, so small as to be difficult or impossible to eliminate in practice. Also, optics of very high quality are required to get a total black interferometric field over a useful aperture. It is a primary object of our invention to facilitate the sensitive detection, display and recording of differences between similar spatial signals relatively independently of minor differences between the films, plates or other records on which the signals are recorded.

Basically, the object of our invention may be attained by the preparation of a multiple diffraction matrix incorporating the two images or other spatial signals to be compared and two diffraction gratings. The matrix is prepared by superimposing two transparencies. A first is prepared by exposing a photograhic emulsion on a transparent film or plate to one of the images to be compared, then exposing the same emulsion with an image of an optical diffraction grating, and developing the composite latent image so formed. The grating employed may be of any conventional variety, but conveniently and preferably is in the form of sinusoidal density distributions. The total exposure time of the double exposure is such that the range of densities produced lie on the linear portion of the Hurter-Driffield curve for the emulsion and developer combination employed. A second transparency is prepared by similarly double-exposing the second image to be compared, reversed with respect to the first image, with the same diffraction grating. The two transparencies are then super-imposed, emulsion to emulsion, and grossly registered so that the images to be compared are substantially in registry. Fine registration is then carried out until the most opaque portions of one grating overlie the least opaque portions of the other. The superimposed transparencies are then illuminated with substantially monochromatic, collimated light. By the use of a frequency plane filter, a diffraction order containing the desired difference signals can then be selected and focused on a screen or plate for display or recording. As will appear, in this manner the background signals representing the identical portions of the two images, as well as differences due to minor structural differences between the transparencies, may be substantially eliminated and the difference signal alone detected.

The manner in which we prefer to carry out the method of our invention will be made clear by the following detailed description, together with the accompanying illustrative drawings.

In the drawings,

FIG. 8 is a schematic diagram of the arrangement of apparatus for carrying out the preferred process of our invention; and FIG. 9 is a schematic diagram of an arrangement of apparatus for carrying out a modification of the process of our invention.

Figure 1:
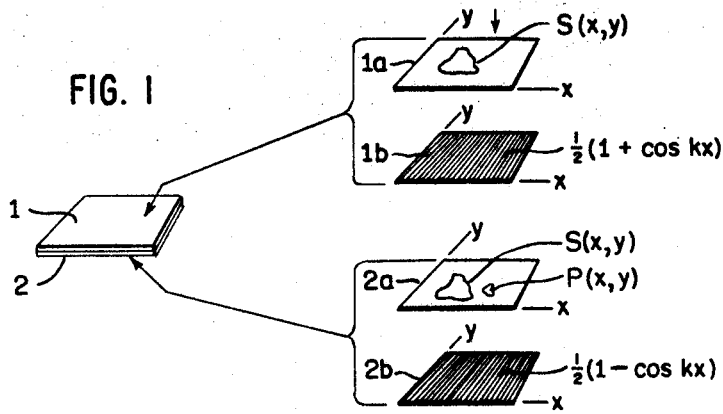
FIG. 1 is a schematic diagram of a multiple diffraction matrix used in the process of our invention.

Referring to FIG. 1, we have illustrated a multiple diffraction matrix comprising a first transparency 1 and a second transparency 2. Each transparency comprises a first image added to a second image by double exposure. As suggested in FIG. 1, the first transparency 1 has a composite image that may be thought of as two superimposed images 1a and 1b. With reference to any convenient set of orthogonal coordinates $x$ and $y$, the transmission factor, defined as the ratio of the amplitude of the incident light to the amplitude of the light transmitted by the image, can be represented as $S(x, y)$. The grating superimposed on this image by double exposure, illustrated at 1b, may similarly be expressed as $(\frac{1}{2} + \frac{1}{2} \cos kx)$, where $k$ is a constant depending on the spacing of the grating. Preferably, this spacing should be small compared to the smallest detail of interest in the photographic images to be compared, and typically might be, for example, 40 to 50 lines per millimeter.

Figure 2:
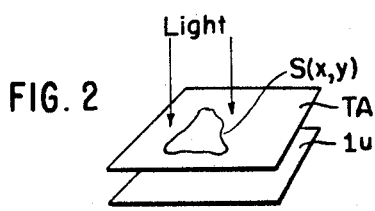
FIGS. 2, 3, 4 and 5 illustrate steps in the process of preparing the matrix of FIG. 1.
Figure 3:
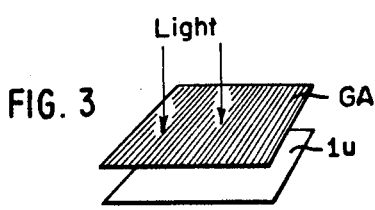

FIGS. 2 and 3 illustrate the preparation of the transparency 1. Referring to FIG. 2, one of the two similar images to be compared is recorded on a first transparency TA. The transparency 1, at this stage in the form of an unexposed, undeveloped photographic plate $1u$ is exposed to light through the transparency TA, either by projection or contact printing, as may be convenient. Next, as shown in FIG. 3, the plate $1u$ is exposed through a first grating recorded photographically as a transparency GA. The doubly exposed plate $1u$ is then developed to form the transparency 1.

Either a glass or a film base may be employed in making the various recordings described herein. In addition, the transparency 1 may be either a positive or a negative, as desired, in dependence on whether the image produced in the process to be described is to be viewed directly or recorded photographically.

The second transparency 2 may be thought of as comprising a first image $2a$ representable as $S(x, y)+p(x, y)$, where $p(x, y)$ is the component of the transmission factor representing the difference between the image corresponding to the first photograph and the image corresponding to the second photograph, it being this difference that it is desired to detect and display or record. The grating image $2b$ superimposed on the image $2a$ is so registered with respect to the first photograph that it may be represented as $(\frac{1}{2}-\frac{1}{2} \cos kx)$. The physical relationship implied by this mathematical relationship is that the gratings are registered 180° out of phase.

Figure 4:
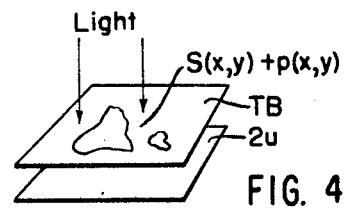

FIGS. 3 and 4 illustrate the preparation of the transparency 2. The basic process is the same as that described above in connection with FIGS. 2 and 3. The second image to be compared with the first is recorded as a transparency TB, through which an undeveloped plate $2u$ is exposed as indicated in FIG. 4. A second exposure of the plate $2u$ is made through a transparency GB on which a second grating image identical with the first is recorded. The plate $2u$ is then developed to form the transparency 2.

Figure 6:
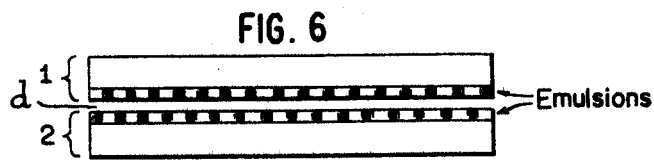
FIG. 6 is a schematic diagram illustrating the relative arrangement of the gratings employed in the matrix of FIG. 1.

Preferably, the exposure process should be arranged to reverse the image on the transparency 2 with respect to the image on the transparency 1, and to make both images of the same size, so that the images on the transparencies can be registered, to the extent that the images are identical, with the transparencies placed emulsion-to-emulsion. When so registered, the actual grating images will be distributed through the emulsions, and the emulsions will in general be thick compared with the wave length of visible light. Thus, the gratings will be effectively separated. FIG. 6 illustrates the relationship between the grating components of 1 and 2, here shown as stepwise gratings. The separation $d$ between the gratings should be as small as possible but in practice will be at least $1.5\lambda$ where $\lambda$ is the wave length of the light used to illuminate the gratings in the process to be described.

Figure 7:
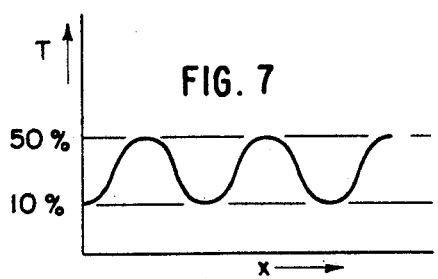
FIG. 7 is a graph showing the density distribution in a grating useful in the matrix of FIG. 1.

While a stepwise grating could be employed, as noted above it is preferred to use a sinusoidal grating having a sinusoidal transmissivity distribution in the $x$ direction as indicated in FIG. 7. Here, the transmission factor T is given in percent transmission of the incident light. As indicated, the transmission factor of the grating images will not typically fluctuate between zero and one hundred percent, but between limits such as ten percent and fifty percent transmissivity.

Referring now to FIG. 8, the multiple diffraction matrix comprising the transparencies 1 and 2, prepared as described above, is placed in the path of a beam of collimated monochromatic light. As shown, the beam may be produced by a laser schematically indicated at 3, and collimated by a suitable lens 4. As the light source, a mercury arc light behind a pinhole aperture could also be employed if so desired.

With the transparencies 1 and 2 arranged as described in connection with FIG. 1, the transmissivity factor of the complete matrix will be given by (1)
$$\frac{1}{K}\left(S(x,y)+\frac{1}{2}+\frac{1}{2} \cos kx\right)\left(S(x,y)+p(x,y)+\frac{1}{2}-\frac{1}{2} \cos kx\right)=\frac{1}{K}[S^2(x,y)+S(x,y)+S(x,y)p(x,y)]+\frac{P(x,y)}{K}\left(\frac{1}{2}+\frac{1}{2} \cos kx\right)+\frac{1}{2K}\left(\frac{1}{2}-\frac{1}{2} \cos^2 kx\right)$$

where K is a normalizing factor. The physical significance of Equation 1 is that the image and grating signals added together to form the first transparency are multiplied by the image and grating signals formed by double exposure on the second transparency. The first term in brackets on the right side of Equation 1 represents an undiffracted wave front propagated normal to the plane of the transparencies 1 and 2. The second bracketed term, which includes the information $p(x, y)$ that it is desired to obtain, represents a beam that is diffracted at an angle $\theta$ normal to the plane of the transparencies 1 and 2, and the third bracket term represents an unwanted beam diffracted at an angle $2\theta$ to the normal.

A lens 5 having a focal length F1 is disposed as shown in FIG. 8 to form an image of the wave front emerging from the diffraction matrix on a frequency plane filter 6, the latter simply comprising a mask having an aperture located to pass the desired first order diffraction beam containing the information $p(x,y)$. A third lens 7 having a focal length F2, that may be the same as the focal length F1 or any other convenient value, is arranged to form an image of the information signal from the frequency plane filter 6 on a suitable display or recording device 8, such as a screen or photographic film or plate. The image so produced will be an image of the difference between the photographic images on the transparencies 1 and 2.

The apparatus indicated schematically in FIG. 8 may be arranged in any convenient manner, as on a conventional optical bench. Alternatively, it may be permanently mounted in a housing provided with an adjustable plate holder for holding and registering the transparencies 1 and 2 and having either a translucent viewing screen or a plate holder mounted at 8 in the end of the housing.

We prefer the form of a multiple diffracting matrix described above, as being more convenient in practice. However, an alternate form of matrix may be employed without departing from the scope of our invention in its broader aspects. Specifically, rather than preparing the two transparencies, each by double exposure to one of the images to be compared and a grating image, four transparencies are prepared. Two of these are photographs to be compared, and two are substantially identical grating images. Referring to FIG. 9, a first transparency 9, on which one image to be compared is recorded, is overlaid with a second transparency 10, on which a sinusoidal grating image is recorded. The transparencies 9 and 10 may be held together, emulsion-to-emulsion, in a suitable conventional adjustable plateholder, not shown, adjustably mounted on an optical bench or the like. Similarly, a pair of transparencies 11 and 12 are overlaid and mounted together for relative and common adjustment. The transparency 11 may be a recording of the second image to be compared, and the transparency 12 may be a recording of a grating image identical to that on the transparency 10.

Figure 5:
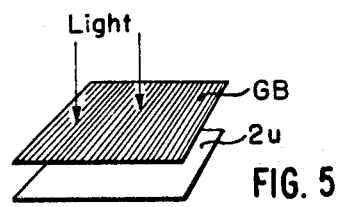

The planes of the transparencies 9 and 10 are disposed at a small angle, exaggerated in FIG. 5, to the plane of the transparencies 11 and 12. The two sets of transparencies are each arranged in a projection system. Associated with the transparencies 9 and 10 is a monochromic light source, here shown schematically as 13, a collimating lens 14, and a lens 15 disposed to focus an image of collimated light from the lens 14 transmitted through the transparencies 9 and 10 on an exposed photographic plate 16. Similarly, a light source 17 produces light collimated by a suitable lens 18 for illuminating the transparencies 11 and 12. A suitable lens 19, of the same focal length as the lens 15, is mounted in position to focus an image of light transmitted by the transparencies 11 and 12 on the unexposed plate 16. The transparencies 9, 10, 11 and 12 are adjusted so that the composite images from the transparencies 9 and 11 are substantially in registry and the grating images from the transparencies 10 and 12 are 180° out of phase. A ground glass may be substituted for the plate 16 while registration is accomplished, as by the use of a conventional camera back and plateholder.

In this way the unexposed plate 16 is exposed and developed. This exposed plate may be substituted for the multiple diffracting matrix, 1 and 2 in FIG. 4 and the processing proceeds identically.

As described in connection with the first embodiment, the transmission factor of the photographic images on the transparencies 9, 10, 11 and 12 may be represented as functions of any convenient orthogonal coordinates $x$ and $y$ in the planes of the emulsions. Assume that the coordinates $x$ and $y$ for the several transparencies have a substantially common mapping on the unexposed plate 16 when all of the transparencies are adjusted into registry as described above. Let $S(x, y)$ represent the image on the transparency 9, $(\frac{1}{2}+\frac{1}{2} \cos kx)$ represent the grating image on the transparency 10, $[S(x, y)+\Delta(x, y)]$ represent the image on the transparency 11, and $$(\frac{1}{2}-\frac{1}{2} \cos kx)$$

represent the image on the transparency 12. The transmission factor of the set 9, 10 is then proportional to (2) $S(x, y)(1+ \cos kx)$ and the transmission factor of the set 11, 12 is proportional to (3) $[S(x, y)+\Delta(x, y)](1- \cos kx)$ The image formed on the unexposed plate 16 may be represented as the sum of (2) and (3), or (4) $2S(x, y)+\Delta(x, y)(1- \cos kx)$ The first term in Equation 4 represents an undiffracted beam, and the second term represents a first order diffracted beam, containing the desired difference information, selected by the frequency plane filter 6 of FIG. 4 and focused on the detector 8. In effect, the unwanted component of the first order diffracted beam contributed by the set 9, 10 is cancelled by a similar beam component of opposite phase contributed by the set 11 and 12, leaving only the desired information.

While we have described our invention with respect to the details of a preferred embodiment thereof, many changes and variations will occur to those skilled in the art upon reading our description, and such can obviously be made without departing from the scope of our invention.

Having thus described our invention, what we claim is:

1. The method of detecting the difference between two similar two dimensional spatial signals comprising the steps of recording the sum of one of said signals and a first transmission grating signal on a first photographic transparency, recording the sum of the second spatial signal and a second transmission grating signal on a second photographic transparency, said transmission grating signals each being constant with respect to positions along a first of two orthogonal reference axes on said transparencies and periodic with a spatial period $p$ with respect to the second reference axis, the period $p$ being small with respect to a predetermined length corresponding to the smallest detail to be resolved, and said reference axes being similarly oriented on said transparencies with respect to identical portions of said similar spatial signals, placing said transparencies together with said spatial signals substantially in registry and said grating signals in phase opposition, illuminating said transparencies with a beam of collimated monochromatic light in an optical processing system, placing a frequency plane filter in the path of light comprising the Fourier transform of the overlaid transparencies and gratings to selectively pass a first order diffracted beam, and forming an image of the difference between said spatial signals from said first order diffracted beam.

2. A method of detecting the difference between two similar fields, comprising forming a latent photographic image of one field in a first photographic emulsion, forming a latent image of a diffraction grating in said first emulsion, forming a latent photographic image of a second field the same size as the first image in a second photographic emulsion, forming a latent image of a diffraction grating of the same size and period as said first grating image in said second emulsion, developing said emulsions to form two transparencies, placing said emulsions together to form a multiple diffracting matrix, transmitting collimated substantially monochromatic light through said matrix, focusing an image of light emerging from said matrix on a frequency phase filter arranged to pass a first order diffracted beam, and forming an image on the first order diffracted beam emerging from the frequency plane filter.

References Cited

UNITED STATES PATENTS

| | | |
|---|---|---|
| 3,437,824 | 4/1969 | Lohmann. |
| 240,374 | 4/1881 | Brigham _____ 355—79 |
| 3,200,701 | 8/1965 | White _____ 356—71 X |
| 3,227,034 | 1/1966 | Shelton _____ 356—71 |
| 3,305,834 | 2/1967 | Cooper et al. _____ 356—71 X |
| 3,355,579 | 11/1967 | Robertson _____ 356—71 X |

OTHER REFERENCES

Scott, "The Production of Variable-Transmission Sinusoidal Patterns," Photographic Sci. & Eng., vol. 7, No. 2, Mar.–Apr. 1965, pp. 86–90 (Spatial Filtering Digest 350/162).

RONALD L. WIBERT, Primary Examiner

W. A. SKLAR, Assistant Examiner

U.S. Cl. X.R.

235—181; 350—162; 355—79